Feb. 27, 1962
R. W. COLLAR
3,023,029
COUPLING NOZZLE
Filed Sept. 17, 1958
2 Sheets-Sheet 1
Fig.1
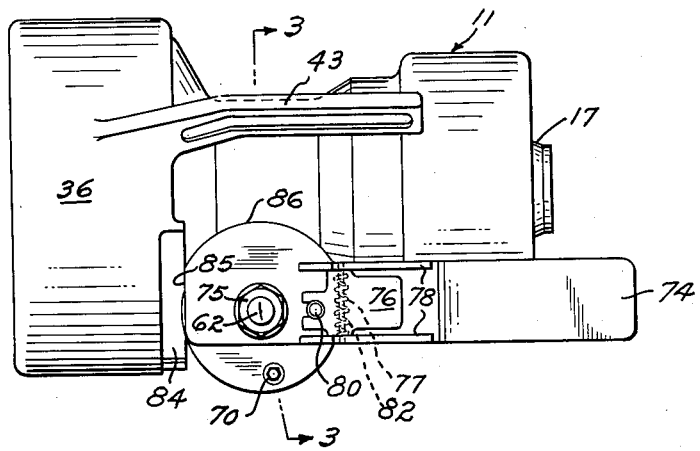
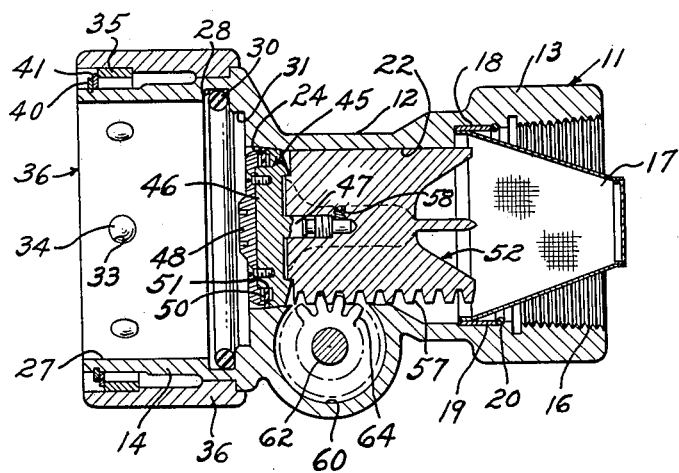
Fig.2
INVENTOR.
Rolland W. Collar
BY
Attorneys Feb. 27, 1962   R. W. COLLAR   3,023,029
COUPLING NOZZLE Filed Sept. 17, 1958   2 Sheets-Sheet 2

INVENTOR.
Rolland W. Collar
BY Mason & Graham
Attorneys

United States Patent Office 3,023,029
Patented Feb. 27, 1962

3,023,029
COUPLING NOZZLE
Rolland W. Collar, Sun Valley, Calif., assignor to Roylyn Incorporated, Glendale, Calif., a corporation of California
Filed Sept. 17, 1958, Ser. No. 761,606
9 Claims. (Cl. 284—19)

This invention relates generally to valved hose couplings and particularly to the nozzle part of such couplings as embody a manually actuatable valve.

Valved hose couplings of the type embodying quick coupling mechanisms commonly embody poppet valves for closing the fluid passage when the parts of the coupling are separated. Usually the valves abut one another when the parts are coupled, and move, or can be moved to open position. The present invention is particularly concerned with the type of device wherein one of the valves, as, for example, the one in the nozzle, is manually actuated by a handle, or the like, and when moved to open position, serves to open the valve of the other part of the coupling.

An object of the invention is to provide novel manually actuatable valve means in a coupling nozzle designed for attachment to the end of a fuel hose, or the like, and adapted to be quickly coupled to the other part of the coupling with which it is intended to mate.

Another object is to provide a nozzle of the general type indicated which is designed to eliminate loss of fluid by preventing accidental loss of fluid during coupling and uncoupling thereby reducing fire and accident hazards. In this connection, it is a particular object to provide a coupling nozzle with manually operable coupling means and manually actuatable valve means separate therefrom but so interrelated that the valve cannot be opened until the coupling means has been moved to the coupled position and, conversely, so interrelated that the coupling means cannot be moved to uncoupled position until the valve has been closed.

A further object of the invention is to provide a novel valve construction and novel means for actuating the same.

A still further object is to provide a coupling nozzle of rugged construction which is relatively inexpensive to manufacture and which can be easily serviced. These and other objects will be apparent from the drawings and the following description. Referring to the drawings:

FIG. 1 is a side elevational view of a nozzle embodying the invention;

FIG. 2 is a central sectional view longitudinally through the nozzle of FIG. 1, the plane of the section being indicated by line 2—2 of FIG. 3;

Figure 3:
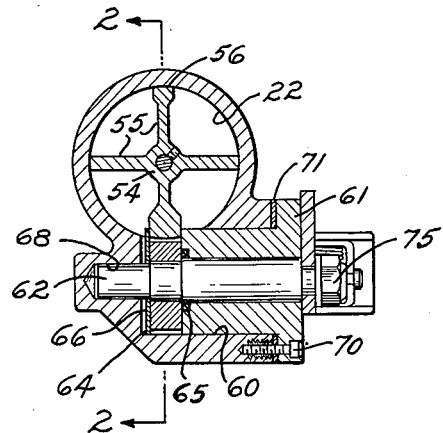
FIG. 3 is a cross-sectional view on line 3—3 of FIG. 1.

More particularly describing the invention, numeral 11 designates a nozzle body which is generally tubular and is shown as having a central section 12, a somewhat belled end 13, and an enlarged end portion 14. The end 13 is internally threaded at 16 and the body is adapted thereby to be attached substantially permanently to a conduit such as a hose, through which fuel or other liquid is to be delivered. A screen 17 is shown mounted in the end 13 which may be considered the inlet end of the device, and this has a marginal ring 18 which is held in place in the bore section 19 by a snap ring 20.

The central portion 12 of the body is provided with a cylindrical bore 22 and forwardly of this, an outwardly flared conoidal valve seat 24. The enlarged end 14 defines a cylindrical bore 27 adapted to receive a nipple (not shown) adapted to be quickly coupled to the nozzle. At its inner end the bore 27 is provided with a groove 28 to receive a seal ring 30 of the O-ring type. An intermediate bore portion 31 extends inwardly from the groove 28.

The end portion 14 is interrupted by a plurality of circumferentially disposed openings 33 through which project locking balls 34. These are shown in retracted position and are adapted to be cammed inwardly into locking engagement with a groove upon the nipple or other element which is inserted in the bore 27 for coupling to the nozzle. The balls are actuated inwardly by a cam ring 35 mounted in a collar 36 which is mounted for limited rotation upon the exterior of the end portion 14 of the body. A snap ring 40 and washer 41 serve to retain the parts.

It will be appreciated that the coupling or locking arrangement, consisting of the cam-actuated balls 34 and the collar 36 with the cam ring 35 is of well-known construction and need not be described in further detail. To assist in manipulation of the coupling means, the collar 36 is provided with a pair of handles 43.

Within the central portion 12 of the body I provide a valve which includes the poppet member 45. This has a disc-like body 46 and a stem 47. The body is provided with a nose plate 48 which serves to clamp an annular gasket 50 mounted upon a reduced peripheral portion 51 of the main body 45 of the valve. This gasket serves to seal against the valve seat 24.

For the purpose of actuating the valve toward and away from the seat, I provide a rack 52 which comprises a central section 54 and four radial vanes 55 extending therefrom. Three of these have rounded edges 56 adapted to slidably fit within the bore 22. The other vane is provided with rack teeth 57. The stem 47 is threadedly received in the central portion 54 of the rack and secured by a set screw 58.

The valve body is formed to provide a substantially circular cavity 60 beneath and extending normal or at right angles to the axis of the central cylindrical portion 22 of the valve body. This is fitted with a bushing 61 in which is rotatably mounted a shaft or pin 62 upon which is fixed a pinion 64 engaging with the teeth 57 formed on one of the vanes of the rack. An O-ring 65 is provided on one side of the pinion and a washer 66 on the other with the end of the shaft being rotatably received in a bore 68. The bushing is flanged and secured to the body by one or more cap screws 70 and a suitable gasket 71 is provided between the parts.

A handle 74 is secured to the outer end of the shaft by a suitable lock nut 75 and the handle includes a pivoted latch plate 76 mounted on a pin 77 between side flange sections 78 of the handle. The latch plate is slotted to receive the head of a pin 80 which is adapted to be received in selected holes 81 in the bushing 61. A spring 82 biases the latch plate to latched position.

Figure 4:
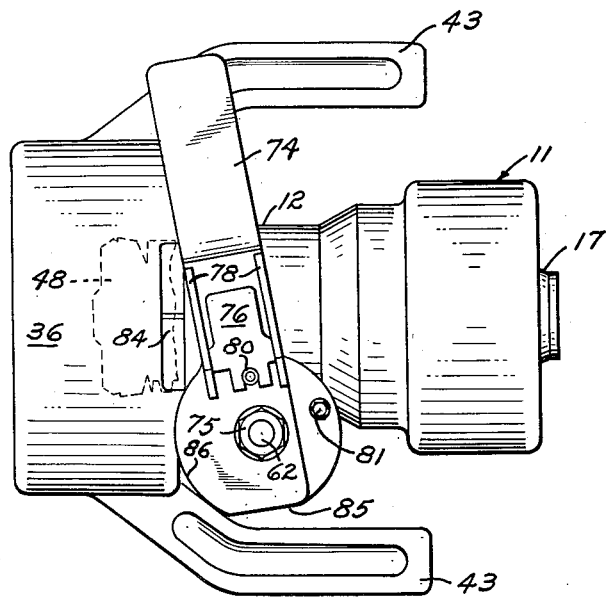
FIG. 4 is a view similar to FIG. 1 but showing the parts in different positions, the view being broken away to show a portion of the structure in section.

One of the chief features of the invention is the provision of interengaging or interlocking means between the valve handle 74 and the operating collar 36 of the coupling means. This comprises a circumferentially extending ridge 84 on the periphery of the collar and the two surfaces 85 and 86 of the handle. The surface 85 is at the inner end of the handle closely adjacent the ridge 84 when the collar is positioned in uncoupled position (FIG. 1). Thus the handle is prevented from being turned to open the valve. The surface 86 projects laterally of the handle so that, when the parts are as shown in FIG. 4 with the valve open, the coupling collar cannot be returned to uncoupled position until the handle has been returned to the valve-closed position. Thus the nozzle is inherently safe for use with any type of fluid to prevent accidental spillage thereof.

Although I have illustrated and described a preferred form of my invention, I contemplate that various changes

I claim:

1. A coupling nozzle, comprising a tubular body having a fluid passage therethrough from end to end and adapted at one end to be attached to a hose, said body defining a valve seat between the ends of said passage, means at the other end of said body for detachably coupling the same to a nipple or the like, said means including a collar mounted for limited rotative movement on said body, a valve mounted in said body and engageable with said seat to control the fluid passage through said body, a handle mounted for limited rotative movement on said body and operatively connected to said valve, and interengaging means on said handle and said collar effective to prevent movement of said handle to open said valve when said collar is in uncoupled position and effective to prevent movement of said collar from coupled position when said handle is in position such that said valve is open.

2. A coupling nozzle as set forth in claim 1 in which the axis of rotation of said collar is normal to and laterally offset from the axis of rotation of the handle and in which the collar has a portion in the path of movement of said handle when said collar is in uncoupled position and said handle is in position such that the valve is closed, and the handle has a portion in the path of movement of said collar when the handle is in position such that the valve is open, and the collar is in coupled position.

3. A coupling nozzle as set forth in claim 1 in which means is provided on said handle and said body for releasably locking said handle in a selected position.

4. A coupling nozzle comprising a tubular body having a fluid passage therethrough from end to end adapted at one end to be attached to a hose, means at the other end of said body for detachably securing a nipple thereto, said body defining a valve seat in said passage between its ends, a rack mounted for movement in said passage axially thereof, a poppet valve in said passage attached to said rack and adapted to engage said seat, a pinion rotatably mounted in said body and operatively engaging said rack, and a handle on the outside of said body operatively connected to said pinion.

5. A coupling nozzle as set forth in claim 4 in which the fluid passage through said body is provided with a cylindrical portion adjacent said valve seat and in which said rack is mounted for sliding axial movement in said cylindrical portion.

6. A coupling nozzle as set forth in claim 4 in which the fluid passage through said body is provided with a cylindrical portion adjacent said valve seat, in which said rack is mounted for sliding axial movement in said cylindrical portion, and in which said rack comprises a central portion and radial vanes extending therefrom with a total cross-sectional area substantially less than the cross-sectional area of said cylindrical portion of said fluid passage.

7. A coupling nozzle, comprising a tubular body providing a passage therethrough and having a valve seat between its ends and a guideway extending axially of the seat, said body being adapted at one end to be attached to a hose or the like, means at the other end of said body for receiving and releasably attaching a nipple or the like, a rack mounted in said guideway for axial movement relative to said valve seat, a valve carried by said rack and engageable with said seat, a shaft mounted in said body for rotation about an axis normal to and laterally of the axis of said valve seat, a pinion fixed to said shaft, and a handle on said shaft externally of said body.

8. A coupling nozzle as set forth in claim 7 in which said guideway comprises a cylindrical portion in the passageway and in which said rack comprises a body having a central portion and radial vanes extending therefrom with one of said vanes having rack teeth thereon.

9. A coupling nozzle as set forth in claim 7 in which the means for releasably attaching a nipple includes a collar mounted for limited movement on said body and in which interengaging means is provided on said collar and said handle for preventing movement of one thereof in a given position of the other.

References Cited in the file of this patent

UNITED STATES PATENTS

| | | |
|---|---|---|
| 1,428,933 | Bean | Sept. 12, 1922 |
| 2,060,748 | Roberts | Nov. 10, 1936 |
| 2,504,569 | Murphy et al. | Apr. 18, 1950 |
| 2,680,030 | Hoelzer | June 1, 1954 |
| 2,854,989 | Worlidge | Oct. 7, 1958 |
| 2,901,008 | Cavett et al. | Aug. 25, 1959 |